(12) United States Patent
Anderberg

(10) Patent No.: US 6,552,327 B2
(45) Date of Patent: *Apr. 22, 2003

(54) METHOD AND APPARATUS FOR POSITIONING ONE END OF A MOVABLE BRIDGE IN RELATION TO A DOOR OF A CRAFT

(75) Inventor: Nils-Eric Anderberg, Trelleborg (SE)

(73) Assignee: FMT International Trade AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,883

(22) Filed: Nov. 12, 1999

(65) Prior Publication Data

US 2003/0057360 A1 Mar. 27, 2003

(30) Foreign Application Priority Data

Nov. 9, 1999 (SE) ................................................ 9904039

(51) Int. Cl.[7] .............................. G06M 7/00; E01D 1/00
(52) U.S. Cl. ............... 250/221; 250/206.1; 250/559.29; 14/71.5
(58) Field of Search .............................. 250/222.1, 221, 250/206, 1, 206.2, 224, 559.29; 14/71.5, 69.5

(56) References Cited

U.S. PATENT DOCUMENTS 4,834,531 A 5/1989 Ward .............................. 356/5
5,109,345 A 4/1992 Dabney et al. .............. 364/459
5,226,204 A 7/1993 Schoenberger et al.
5,278,423 A * 1/1994 Wangler et al. ............. 250/561

FOREIGN PATENT DOCUMENTS

FR 2573724 5/1986 ........... B64F/1/305
WO WO 96/08411 * 3/1996

OTHER PUBLICATIONS

Jarvis, A Laser Time–of–Flight Range Scanner for Robotic Vision, 1983, IEEE, vol. pami–5, 505–512.*

* cited by examiner

*Primary Examiner*—Stephone B. Allen
(74) *Attorney, Agent, or Firm*—Orum & Roth

(57) ABSTRACT

A device for positioning one end of a movable bridge in relation to a door on a craft comprises a control unit for controlling at least the vertical movement of the bridge and for storing information on the position of the door on the craft. The control unit comprises a sensor arranged to transmit electromagnetic radiation in different directions, and to detect electromagnetic radiation; and the control unit is arranged to measure the time difference between the transmission of radiation in at least two different directions and the detection of said radiation, thereby determining the position of the bridge in relation to the craft in said directions, and to control at least the vertical movement of said one end of the bridge to a position adjacent to the door in response to the determined position of the bridge and the stored information on the position of the door.

20 Claims, 3 Drawing Sheets

METHOD AND APPARATUS FOR POSITIONING ONE END OF A MOVABLE BRIDGE IN RELATION TO A DOOR OF A CRAFT

BACKGROUND OF THE INVENTION

The present invention relates to a method and a device for positioning one end of a movable bridge to a door on a craft.

DISCUSSION OF THE PRIOR ART

Modern airports or harbors are usually equipped with passenger bridges on which the passengers may walk safely between the terminal building and the aircraft or the boat, while being sheltered from the rain and wind.

A known mobile-type passenger bridge used at airports comprises a rotunda that is connected to a terminal building and is rotatably mounted on a column anchored in the ground. From the rotunda extends a passageway, which is made up of a number of telescoping elements, enabling variation of the length of the passageway. At the end of the passageway located farthest away from the rotunda, there is provided a cabin which is pivotable in relation to the passageway. The passageway element to which the cabin is attached is suspended from a vertically adjustable frame, which in turn is supported by a bogie with wheels that can be driven separately.

The passenger bridge normally occupies a parking position in the vicinity of the place where the aircraft is to come to a halt after landing. When the aircraft has come to a halt, an operator controls the passenger bridge vertically and angularly, pivots the cabin and telescopically extends the passageway in the direction of the aircraft, such that the end of the bridge is connected to the door of the aircraft. The operation in the horizontal plane is achieved by altering the speeds of the bogie wheels in relation to one another.

Owing to its complexity, this operation requires operators with special training, which of course is expensive for the airlines. Furthermore, it takes a long time to perform the connection. Also it happens that the bridges bump into the aircraft as a result of mismaneuvering on the part of the operator, thus damaging the aircraft. Apart from being costly it also happens that the person who is to maneuver the bridge is not present in time. This results in unnecessary delays which are costly. It is important to minimize the time for docking of the bridge to the craft in order to minimize the time the craft is standing still.

The bridge has to be adjusted also after connection to the aircraft. As passengers enter or exit the aircraft, the height of the aircraft changes. To avoid damage to the aircraft, e.g. to avoid that a force is exerted on the door, the height of the bridge has to be adjusted accordingly. Conventionally, this is achieved with a wheel that is in contact with the aircraft and that senses movement of the aircraft in relation to the bridge. However, the wheel may damage the aircraft if the wheel is incorrectly adjusted. The wheel may also malfunction due to too small friction between the wheel and the aircraft.

PCT Application SE95/01034 describes a device for controlling the movement of a passenger bridge. However, this system is reliable only for movement to a position close to the aircraft. Thus, the bridge has to be operated manually during the last part of its movement.

U.S. Pat. No. 5,226,204 describes an automatic loading bridge with a different control system. The system uses video cameras in the control of the bridge. The system maneuvers an end of the bridge to a position close to the door, whereupon a person controls the bridge, during the last part of its movement, by looking at images recorded by the video cameras. Suggestions are made in the patent specification that the system could be arranged to operate fully automatically using image-processing of the recorded images to calculate the distance between the bridge and the aircraft. However, image-processing is time-consuming, thus making the movement based thereon slow.

Thus, there is a need for a reliable system that provides the necessary information about the position of the bridge relative to the craft when connected to the aircraft.

SUMMARY OF THE INVENTION

An object of the present invention is to provide a device that solves the problems described above.

A further object of the present invention is to provide a reliable device for measuring vertical movements of a craft relative to a passenger bridge.

A further object of the present invention is to provide a device that facilitates the implementation of a fully automatic system for controlling a loading bridge.

One more object of the present invention is to provide a method of controlling the connection of one end of a loading bridge to a door on a craft.

Still, a further object of the present invention is to provide a passenger bridge that is arranged to automatically adjust its height to the height of the door on a craft.

Another object of the present invention is to provide a passenger bridge that is arranged to automatically connect to a door on a craft in reasonable time.

According to the invention, these objects are achieved by a method, a device and a bridge as claimed in the appended claims.

A device for positioning one end of a movable bridge in relation to a door on a craft comprises, according to the present invention, a control unit for controlling at least the vertical movement of the bridge and for storing information on the position of the door on the craft. Furthermore, the control unit comprises a sensor arranged to transmit electromagnetic radiation in different directions; and to detect electromagnetic radiation; and the control unit is arranged to measure the time difference between the transmission of radiation in at least two different directions and the detection of said radiation, to thereby determining the position of the bridge in relation to the craft in said directions, and to control at least the vertical movement of said one end of the bridge to a position at the door in response to the determined position of the bridge and the stored information on the position of the door.

Preferably, the different directions are separated at least in the vertical direction. This facilitates the determination of the position of the bridge relative to the craft in the vertical direction.

By measuring the distance between the bridge and the craft in different directions, separated in the vertical direction, and with knowledge of the craft, it is possible to control the height of the bridge in relation to the craft. The device does not rely on contact between the craft and the device and therefore any risk of damage to the craft due to the device is eliminated. Further. the device cannot malfunction due to too low friction at the surface of the craft. Furthermore, the device according to the invention may be used to automatically control the connection of the bridge to a door on a craft. As the device is not dependent on contact with the craft, it is reliable.

A method according to the invention for positioning one end of a movable passenger or goods loading bridge adjacent to a door on a craft comprises the steps of storing information about the position of the door on the craft, transmitting electromagnetic radiation in different directions, detecting electromagnetic radiation having the same wavelength as the transmitted radiation, measuring the time between the transmission of radiation and the detection of radiation from at least two different directions, thereby determining the position of the bridge in relation to the craft in said directions, and moving the bridge, in response to the determined position and the stored information.

There are numerous ways in which the electromagnetic radiation might be transmitted from the sensor.

Preferably the sensor in a device according to the present invention is arranged to repeatedly transmit a set of electromagnetic pulses in different directions, and to detect electromagnetic pulses after reflection on a craft. The control unit is arranged to measure the time between the transmission of an electromagnetic pulse and the following reception of an electromagnetic pulse having the same wavelength as the transmitted pulse, for at least two of the transmitted pulses, thereby determining the distance between the bridge and the craft as a function of the direction, and to control the movement of said one end of the bridge to a position at the door in response to the measured times and the stored information.

Based on the measured times, it is possible to determine how the bridge is positioned in relation to the bridge. As it is only the time between the transmission of a pulse and the following reception of a pulse at the same wavelength that is measured, the necessary calculations can be done in real time. Thus, it is possible to control movement of the bridge at a considerable speed during connection based on calculations performed simultaneously.

According to one aspect of the present invention, the sensor is arranged to transmit the pulses separated in time. This enables the sensor to be implemented using a single emitter and a single receiver.

According to a less preferred aspect of the present invention, the sensor is arranged to transmit the pulses separated in wavelength, so that the pulses are transmitted at different wavelengths in the different directions. Accordingly the sensor is arranged to receive pulses separated in wavelength. This enables the time between the different sets of pulses to be very short as the pulses are transmitted in parallel. However, this alternative is more complex and expensive.

The device according to the present invention is not limited to the transmission of the electromagnetic radiation as pulses. Alternatively the radiation may be emitted in a single pulse that illuminates an area of the craft. The sensor is arranged to discriminate between radiation from different directions. This is, however, a less preferred alternative as the sensor has to emit a high energy pulse in order to get a reasonable signal to noise ratio in the signal reflected from the craft.

Preferably, the sensor is arranged to transmit the radiation at optical wavelengths since transmitters transmitting in the optical range are quite inexpensive. Alternatively the sensor may be arranged to emit radiation at other wavelengths, e.g. microwaves.

Advantageously the sensor comprises a detector and a transmitter as separate elements even if it would be possible to use, for example, a diode as both transmitter and receiver. Preferably, the transmitter comprises at least one light emitting diode as this is a cheap light source. The diode may be a laser diode but may also be an ordinary light emitting diode. Alternatively, other light sources such as pulsed lasers may be used.

Preferably the detector comprises at least one photodiode, as this is a cheap and reliable detector. Naturally, other sensors such as a photomultiplier tube may be used.

As stated above, the sensor is preferably arranged to transmit a set of pulses in different directions. This may be accomplished by using a number of transmitters emitting radiation in different directions. However, preferably the transmitter comprises one light emitting diode (LED) and a rotatable mirror.

There are numerous ways of controlling the directions in which the electromagnetic pulses are transmitted depending on how the sensor is arranged. In order to be able to determine in which direction the pulses are emitted, it is necessary to calibrate the sensor on installation. Further, in case the sensor comprises an LED and a rotatable mirror, a sensor is preferably arranged at the mirror.

The speed of rotation of the mirror is chosen so as to achieve measured profiles at a sufficient rate while still being able to process the measured information between the different sets of pulses. Preferably, the rate of rotation is chosen in the range 1–1000 Hz and most preferred in the range 10–100 Hz.

The number of directions of the light pulses is chosen such that a sufficient number of measurements is provided for the control of the bridge. The number of different directions is at least two and preferably 10–10000 different directions and most preferred 100–1000 different directions.

The rate at which the pulses are emitted is preferably in the range 1 kHz–10 MHz.

The sensor may be arranged on either the craft or the bridge. However, it is most preferred to arrange the sensor on the bridge as the sensor otherwise has to be equipped with a radiotransmitter to transmit information to the control unit.

The sensor might be a separate unit or integrated with the control unit.

The largest angle between the directions in which the pulses are transmitted is advantageously between 1° and 180°, and preferably between 5° and 90°.

The sensor may be arranged to determine the position of the bridge relative to the craft in three dimensions. However, the control unit is preferably arranged to transmit pulses in directions that define a plane. Thus the measurements with the sensor are used to position the bridge in two directions while the positioning in the third direction is based on an additional measurement. Thus, the control unit is preferably arranged to receive a first position signal with information about the position of the craft in the longitudinal direction of the craft, and the transmitting means is arranged to transmit pulses in a plane substantially perpendicular to said direction.

To determine the position of the bridge at least in the longitudinal direction it is advantageous to have actuators on the bridge that measures how the bridge is positioned. Thus, the control unit is arranged to receive a second position signal with information on the position of the bridge.

A device according to the invention may, as mentioned above, be utilized in a fully automatic passenger loading bridge. In such a system there is no need for an operator to control the movement of the bridge. However, due to local regulations there might still be a need for supervision of the operation of the bridge. The supervision of a number of bridges is preferably centralized to a single location at which a small number of persons supervise the operation of a large number of bridges. Each of the loading bridges is equipped with at least one video camera. Images from the bridge is transmitted to the bridge by wire. Preferably the supervisor may stop the movement of the bridge is he recognizes a malfunction. The central location may be anywhere in the world and the flow of information between the central location and the bridge may occur on the internet.

It goes without saying that the above features can be combined in the same embodiment.

In order to further illustrate the invention, detailed embodiments thereof will now be described, without the invention being restricted thereto.

DESCRIPTION OF THE DRAWINGS

Embodiments of the present invention will now be described with reference to the accompanying drawings, in which.

DETAILED DESCRIPTION OF PREFERRED EMBODIMENTS

The invention will now be exemplified by embodiments illustrating how the invention may be applied to a conventional passenger bridge of the Apron Drive type described in the introduction to this specification.

Figure 1:
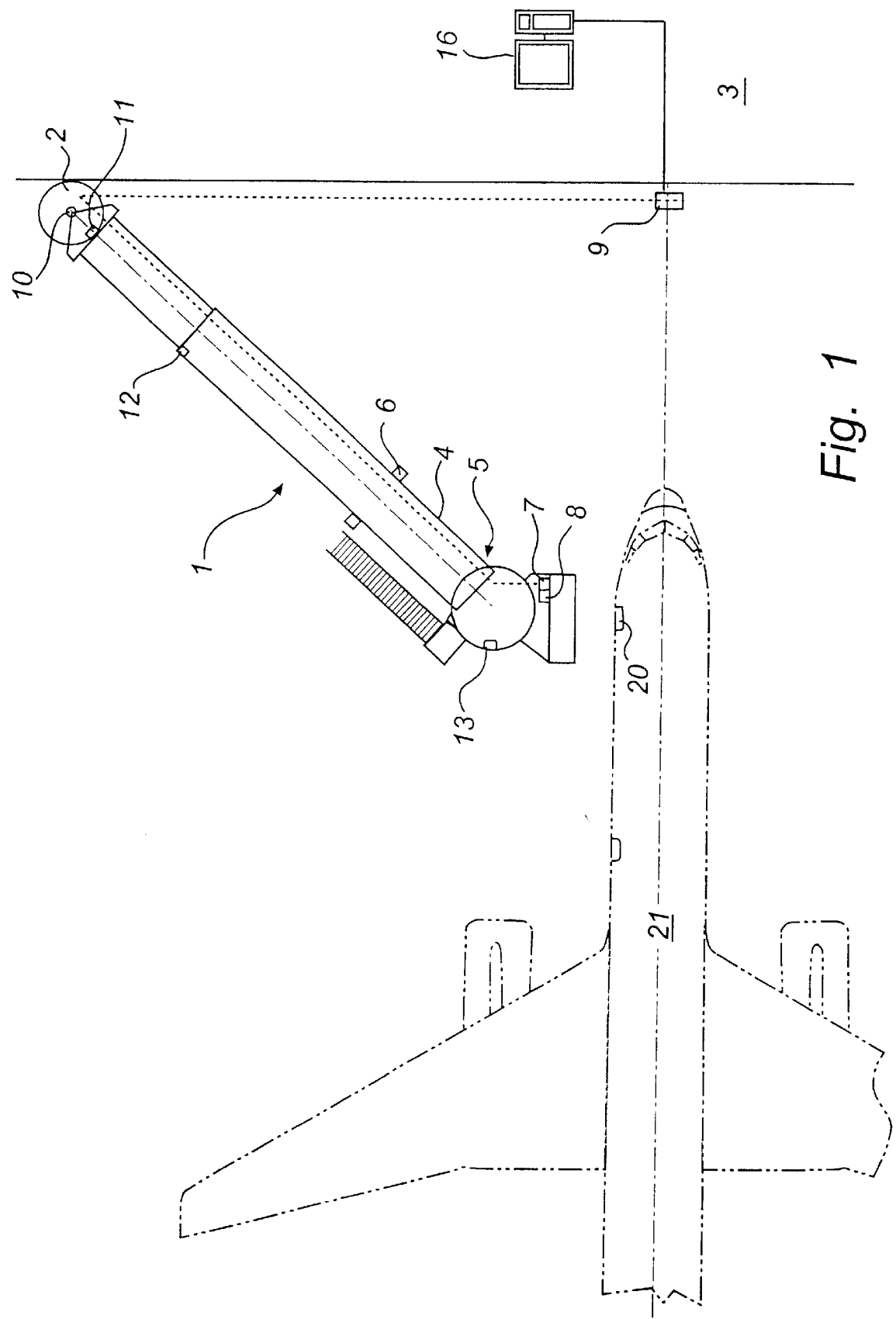
FIG. 1 shows a passenger bridge for an aircraft, the bridge being equipped with a device according to a preferred embodiment of the present invention.

FIG. 1 shows a passenger bridge 1 comprising a rotunda 2, which is connected to a terminal building 3 and from which extends a passageway 4. This passageway 4, whose length can be varied by telescoping ends with a pivotable cabin 5. Also shown in FIG. 1 is an aircraft 21 with a door 20 to which the passenger bridge is to be connected.

Figure 2:
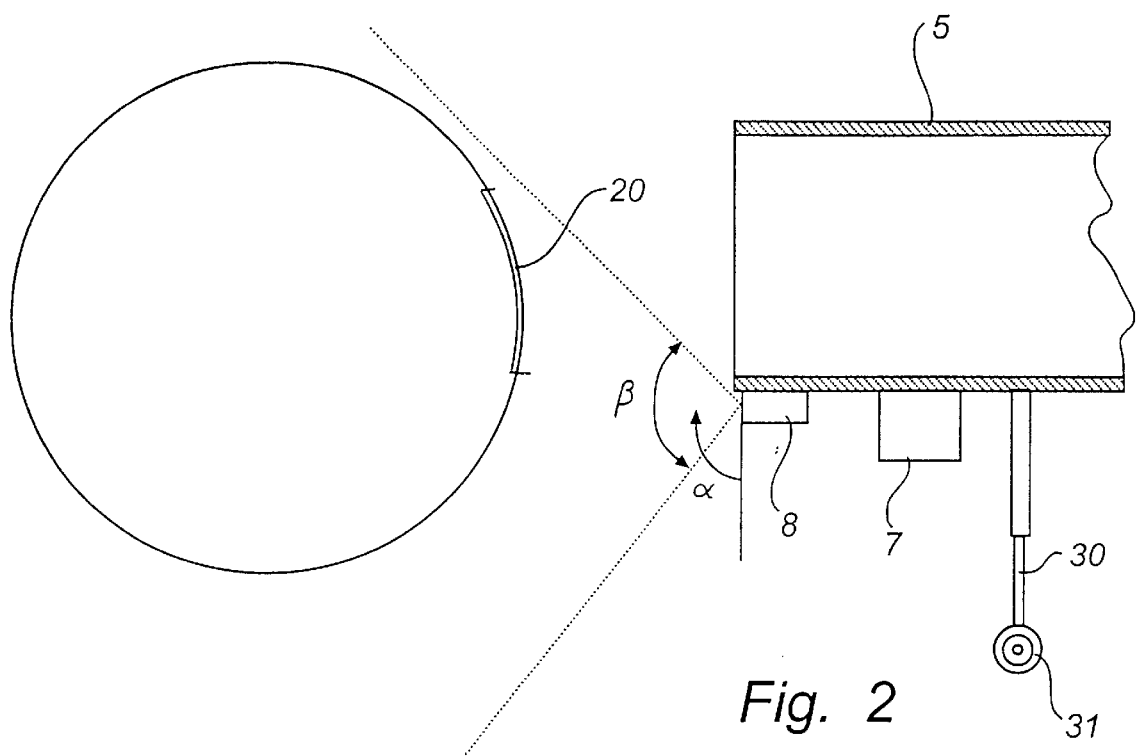
FIG. 2 is a more detailed view of a part of the bridge close to the body of an aircraft.

As mentioned by way of introduction, the passenger bridge can be guided to different positions to be connected to an aircraft. To this end, the passenger bridge 1 comprises a bogie 30 with driving wheels 31 that can be acted upon with a view to achieving angular displacement of the passenger bridge as well as telescoping of the passageway elements to alter the length of the passenger bridge as shown in FIG. 2. Furthermore, the passageway 4 is suspended from a frame 6, which can be used for adjusting the height of the passenger bridge 1. Finally, the passenger bridge has means which can be acted upon with a view to pivoting the cabin 5.

The passenger bridge shown in FIG. 1 is provided with a device for connecting the passenger bridge to the door on the aircraft and to adjust the height of the bridge when it is connected to the door 20. This device comprises a local computer 7 which is connected to a sensor 8. The local computer is connected to, and adapted to act upon, the means for positioning the passenger bridge, to be more specific, the means for adjusting the height of the passenger bridge, for adjusting the length of the passenger bridge by telescoping of the passageway elements, for pivoting the cabin 5 and for angularly displacing the passenger bridge 1. Information on the positions of the doors of all the aircraft models that are to be used in connection with the bridge is stored in a central computer 16. According to the preferred embodiment, the information is stored as coordinates of the door centers in relation to the aircraft.

The bridge is equipped with first, second and third transducers 10, 11 and 12 to determine the angular position of the passageway, the height of the passageway and the relative positions of the passageway elements, respectively. The bridge is further equipped with a fourth transducer 13 to sense the angular position of the cabin 5. A measuring device 9 connected to the local computer is arranged at the terminal building 3. The measuring device is arranged to measure the distance in the longitudinal direction to the aircraft 21 and to send this information to the local computer 7.

The sensor 8 is arranged to repeatedly emit a set of electromagnetic pulses in different directions.

FIG. 2 shows a part of the cabin 5, the sensor 8 and the computer 7. The computer and the sensor are shown as two separate elements but may, of course, be implemented in an integrated unit. According to the preferred embodiment, the photodiode emits the pulses in a plane within an angle $\beta$. The plane in which the pulses are emitted is essentially perpendicular to the longitudinal axis of the aircraft.

Figure 3:
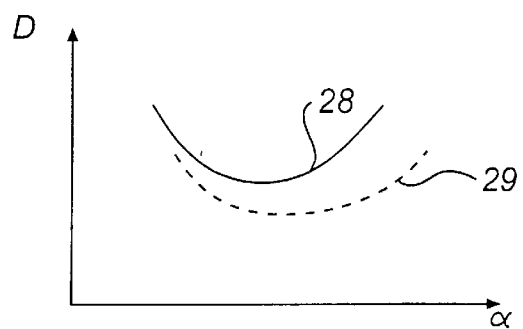
FIG. 3 is a diagram showing the distance between the bridge and the craft as a function of the angle at which the pulse was transmitted.

FIG. 3 shows a profile 28 that has been measured with the sensor. In FIG. 3 the distance between the sensor and the aircraft is shown as a function of the angle $\alpha$ from the vertical direction. From the measured profile and the information stored in the computer it is possible to maneuver the bridge to the door on the craft and also to adjust the height of the bridge according to alterations in height of the aircraft when passengers enter or exit the aircraft. Also shown in FIG. 3 is the profile 29 when the bridge is correctly positioned in relation to the aircraft.

Figure 4:
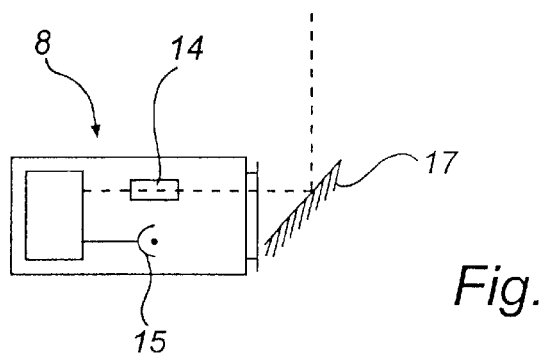
FIG. 4 is a schematic view of a rotatable mirror and a light emitting diode arranged adjacent to the same, comprising a part of the sensor according to a preferred embodiment of the present invention.

FIG. 4 shows in greater detail the sensor 8 according to a preferred embodiment of the present invention. The sensor has a light-emitting diode (LED) 14, a photodiode 15 and a rotatable mirror 17. Light from the sensor is transmitted and received via the mirror 17. According to the preferred embodiment, the mirror rotates at 5–50 Hz and the LED emits pulses at 1–100 kHz.

The connection of the bridge to a door on an aircraft will now be described. When a plane has landed, information about the type of aircraft 21 is sent to the computer 7 from a central computer 16. When the plane has come to a stop close to the bridge, a signal is sent to the computer 7 with information on the position of the aircraft 21 in the longitudinal direction. According to a preferred embodiment of the present invention, the cabin 5 of the passenger bridge is moved to an approximate position based on the information stored in the computer. The movement of the bridge is controlled with the transducers 10–13. Thus, the drive means are driven such that the cabin is moved to a position 2–10 meters from the correct position. The movement from the approximate position to the connection of the bridge to the door is based on the measured profile. However, in the longitudinal direction the position of the bridge is determined on the basis of the signals from the transducers 10–13 and adjusted to correspond to the position that is derived from the distance measured with the measuring device 9 and the information stored in the computer 7. From the measured profile, it is evident in which direction from the sensor the distance to the aircraft is minimal. This angle may be used to adjust the height of the bridge. After connecting the bridge to the door 20 on the aircraft 21, the sensor 8 is used to adjust the height of the bridge as the height of the aircraft alters due to passengers entering or leaving the aircraft.

Figure 5A:
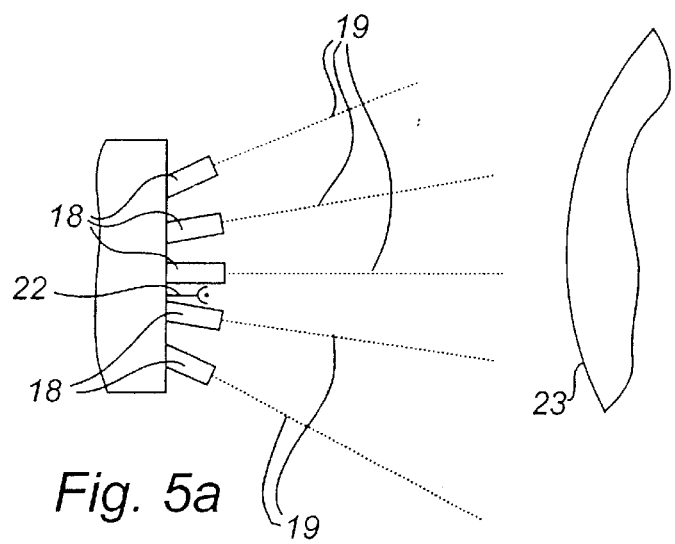
FIG. 5A shows an embodiment of an arrangement of the sensor.
Figure 5B:
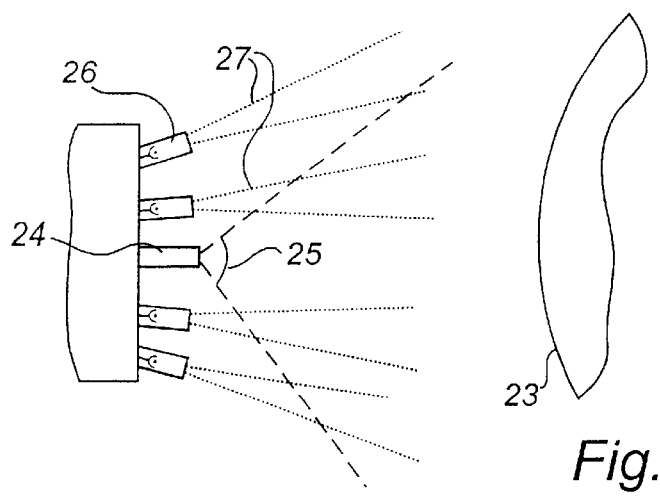
FIG. 5B shows another embodiment of an arrangement of the sensor.

FIG. 5 shows some alternatives to the sensor 8 shown in FIG. 4. In FIG. 5a the sensor comprises a number of diode lasers 18 that transmit radiation in different directions shown as the dotted lines 19. The diodes emit pulses separated in time and a photodiode 22 receives the reflected pulses from the whole solid angle in which the light pulses are emitted. In this way, no rotating parts are necessary. A part 23 of the aircraft is also shown. In FIG. 5b the positions of the transmitter and the receiver have changed. In FIG. 5b a single transmitter 24 emits microwaves into a solid angle denoted 25. A number of receivers 26 are arranged to receive radiation from different solid angles denoted 27. A part 23 of the aircraft is shown in FIG. 5b.

The invention has been described in connection with passenger bridges for aircrafts. However, the present invention is not limited to be used for aircrafts but may be used also with, for example, passenger bridges for ships.

The invention is not limited to the embodiments described above but may be modified in various aspects. The transmitter may, for example, comprise any element that can be used to transmit electromagnetic pulses, such as a laser, a flashlight or any other element that exists presently or that is to be discovered in the future.

The computer 7 may be a number of computers arranged to operate as the computer 7.

What I claim and desire to secure by Letters Patent is:

1. A device for positioning one end of a movable bridge in relation to a door on a craft, having a control unit for controlling at least the vertical movement of the bridge and for storing information on the position of the door on the craft,
    wherein the control unit comprises a sensor arranged
        to transmit electromagnetic radiation in different directions; and
        to detect reflections of said electromagnetic radiation;
    and that the control unit is arranged
        to measure the time difference between the transmission of radiation in at least two different directions and the detection of said radiation;
        to determine the position of the bridge in relation to the craft;
        to control the movement of said one end of the bridge to a position adjacent to the door in response to the determined position of the bridge and, the stored information on the position of the door; and
    after the bridge is connected to the craft
        to control at least the vertical movement of one end of the bridge to maintain the position adjacent to the door in response to the determined position of the bridge in relation to the craft and stored information on the position of the door.

2. A device according to claim 1, wherein the sensor is arranged to transmit microwaves.

3. A device according to claim 1, wherein the sensor is adapted to be arranged at said one end of the bridge.

4. A device according to claim 1, wherein the sensor is arranged
    to receive a position signal with info about the position of the craft in the longitudinal direction of the craft, and
    the control unit is arranged
        to control the movement of said one end of the bridge to a position adjacent to the door in response to the determined position of the bridge, the stored information and the signal.

5. An automatic device for positioning a passenger or goods loading bridge at a door on a craft, according to claim 1 further comprising
    a loading bridge which has one end that is to be connected to said door, and
    moving means for moving the loading bridge.

6. A device according to claim 1 wherein the sensor does not contact the craft.

7. A device according to claim 1, wherein the sensor is arranged to transmit radiation at optical wavelengths.

8. A device according to claim 7, wherein the transmitter is arranged to transmit pulses at a rate in the range of 1 kHz to 10 MHz.

9. A device according to claim 1, wherein the electromagnetic radiation is in the form of pulses; and
    the time is measured between the transmission of an electromagnetic pulse and the following reception of an electromagnetic pulse having the same wavelength as the transmitted pulse.

10. A device according to claim 9, wherein the sensor is arranged to transmit and receive pulses separated in wavelength.

11. A device according to claim 9, wherein the sensor is arranged to transmit the pulses separated in time.

12. A device according to claim 1, wherein the sensor comprises a detector and a transmitter, the transmitter comprising at least one light-emitting diode.

13. A device according to claim 12, wherein the detector comprises at least one photodiode.

14. A device according to claim 12, wherein the transmitter comprises one light-emitting diode and a rotatable mirror.

15. A device according to claim 14, wherein at least one electrical pulse is transmitted to the control unit for each revolution of the mirror.

16. A device according to claim 14, wherein the mirror with the diode is arranged to make 1–100 revolutions per second.

17. A method for positioning at least in the vertical direction one end of a movable bridge at a door on a craft, comprising the steps of:
    storing information about the position of the door on the craft,
    transmitting electromagnetic radiation in different directions,
    detecting electromagnet radiation having the same wavelength as the transmitted radiation,
    measuring the time between the transmission of radiation and detection of radiation from at least two different directions,
    determining the position of the bridge in relation to the craft, and
    moving the bridge in response to the determined position and stored information;
        connecting said movable bridge to the craft adjacent to a door,
        continuing to transmit electromagnetic radiation in different directions,
        continuing to detect electromagnetic radiation having the same wavelength as the transmitted radiation,
        measuring the time between the transmission of radiation and the detection of radiation from at least two different directions, thereby determining the position of the bridge in relation to the door, and moving the bridge in at least the vertical direction in response to the determined position and stored information to maintain the position adjacent to the door.

18. A method according to claim 17, wherein the radiation is transmitted, repeatedly, in a set of electromagnetic pulses in different directions, and that the detection of radiation comprises detection of electromagnetic pulses having the same wavelength as the transmitted pulses, and that the method also comprises the steps of:

measuring the time between the transmission of a pulse and the detection of a pulse with the same wavelength, determining, based on the directions of the pulses and the corresponding measured times, the position of the bridge in relation to the door in the different directions, and moving the bridge in response to the determined position and the stored information to maintain a position adjacent the door.

19. A method according to claim 17, also comprising the steps of measuring the position of the craft in the longitudinal direction of the craft, and moving the bridge also in response to said position in the longitudinal direction.

20. A method according to claim 17, wherein the pulses are transmitted within a predetermined solid angle.

* * * * *